June 29, 1965  J. MOLITORISZ  3,191,366
HAY WAFER FORMING MACHINE
Filed March 18, 1963  6 Sheets-Sheet 1

Fig. 1.

INVENTOR.
JOSEPH MOLITORISZ
BY
ATTORNEY

June 29, 1965 J. MOLITORISZ 3,191,366
HAY WAFER FORMING MACHINE
Filed March 18, 1963 6 Sheets-Sheet 2

Fig. 2.

INVENTOR.
JOSEPH MOLITORISZ
BY
ATTORNEY

June 29, 1965  J. MOLITORISZ  3,191,366
HAY WAFER FORMING MACHINE
Filed March 18, 1963  6 Sheets-Sheet 6

INVENTOR.
JOSEPH MOLITORISZ
BY
ATTORNEY 3,191,366
HAY WAFER FORMING MACHINE
Joseph Molitorisz, East Lansing, Mich., assignor to Michigan State University, East Lansing, Mich.
Filed Mar. 18, 1963, Ser. No. 265,805
18 Claims. (Cl. 56—1)

This invention relates to machines of the type in which field mown hay is for purposes of transport, storage and feeding wrapped in rolls of suitable density and retained in such form for purposes of transport and storage but released from such form prior to or during consumption by the animal. Commonly these wrapped rolls are relatively very large size in the form of bales of cylindrical form which are either left in the fields for the animals themselves to feed upon as they choose or they are stored by farmers for subsequent use as needed.

More particularly, however, my machine while of this general type relates more specifically to a machine which will produce preferably from hay of the length mown axially wrapped rolls of hay of small diameter, compressed and firmed to a relatively high density for a sufficient length of time to attain mechanically interlocking and adherent bonding of the wrapped hay such that when it is radially divided into axially short or thin wafers of dimensions acceptably receivable within the mouth of the animal in one piece they possess stability of form. This may be said to be the general aim of this invention. In this aim this invention differentiates as a type from the general type of machines adapted only to form bales of relatively large size and relatively low density which are incapable of retaining their form without some form of twine or wire tying, and are altogether unadaptable for division into feed articles such as wafers.

In achieving the production of wafers of the characteristic above referred to I aim to attain a machine which will not only produce them more efficiently and at a greater rate than machines of different type at present in use, for examples reciprocating and ring die machines which preliminarily bite long length hay into lengths of wafer dimensions before reducing it to pellet or wafer form, but also to produce them more efficiently and at a greater rate than other machines of the same general type as this one.

An accompanying and important aim is to produce a machine outstandingly adapted for field use directly upon swathed or windrowed hay in which the disadvantages of extremes of size, weight, first cost, cost of maintenance, and overlarge consumption of power heretofore experienced, are largely if not wholly overcome. Such disadvantages have for some years considerably retarded the growth of use of pelleted or wafered field hay for cattle feeding despite such improvements as have been made to date in handling, storage and animal acceptability characteristics of the product.

In general terms the machine I have devised comprises a machine frame of a length comparable to that of modern hay balers, a hay pickup of one of the standard types transversely mounted at the forefront of the frame, a multiple number of longitudinally extending hay row wrapping and wafer making units operating each about the axis of its formed hay roll and supported by said chassis in bank with their axes in transverse alignment somewhat to the rear of said pickup, suitable hay transfer means extending from the pickup to the fore-end of said bank of units and adapted to feedingly deliver hay to the forward portions of said units, means for severing completed hay rolls into wafers, wafer collecting means below and behind said units and below their axes, transaxially and transversely extending means for driving the moving elements of said units, located mainly below said transfer means and said collecting means, and means connecting said driving elements with a source of power.

Each unit of the transversely aligned longitudinally extending bank of units for making the hay rolls and of them the wafers, is comprised of a continuously driven elongated rotatable hay wrapping spindle cantileverly supported adjoining a driven end which is forwardly located and projects from its support in its greater elongation freely into space to a free end rearwardly located, a hay roll feeding and forming means which coacts with driven end portions of the freely projecting spindles for directing hay to and confining its becoming wrapped about the spindle principally to a hay roll forming zone adjoining the spindle support at its forward end to form in the said zone an initially less elongated hay roll of wafer diameter under compression, a means for exerting an axial force upon the hay roll while being so formed confined and compressed, to move it along the spindle as its form is being geometrically shaped and further elongated, and into a firming and compressing zone adjoining the free end of the spindle for continued rotation thereby, and hay roll firming means coacting with the spindle in this firming zone for continuing and extending the confinement and compression of the geometrically completed hay roll, and finally a means for dividing the hay roll as so formed and firmed and stabilized into wafer lengths while yet under rotation by said spindle. Preferably though not necessarily I constitute the means coacting with the spindle first to feed and form and next to firm the hay roll in the respective zones as an annular series of rolls each of a diameter not widely different from that of the hay roll to be formed, the rolls of the series surrounding tangentially a co-extending substantially cylindrical space substantially of hay roll diameter whose axis is the axis of the spindle, and which space is, of course, to be occupied by the transaxially wrapped hay roll. While I prefer to use the greatly elongated spindle, for reasons which will become obvious upon the full understanding of my invention, I do not consider its use absolutely necessary.

In the joint interest of brevity and clarity I shall first catalogue by reference numbers in numerical order the several differently functioning but associated major assemblies reciting their relationship to each other; then similarly catalogue in order the elements and features of elements of which these assemblies are comprised reciting their relationship to each other and naming their respective functions; whereupon in order I shall describe the operation of the whole machine, the manner in which the machine endows the ultimate product with the characteristics set forth in the co-filed application above referred to and realizes for me the qualities for which I have designed the machine. Finally I shall similarly catalogue and treat of the elements and features of the several illustrated modifications.

*The principal assemblies of the machine*

The arrows to which the numerals are applied designate generally the respective assemblies.

Figure 1:
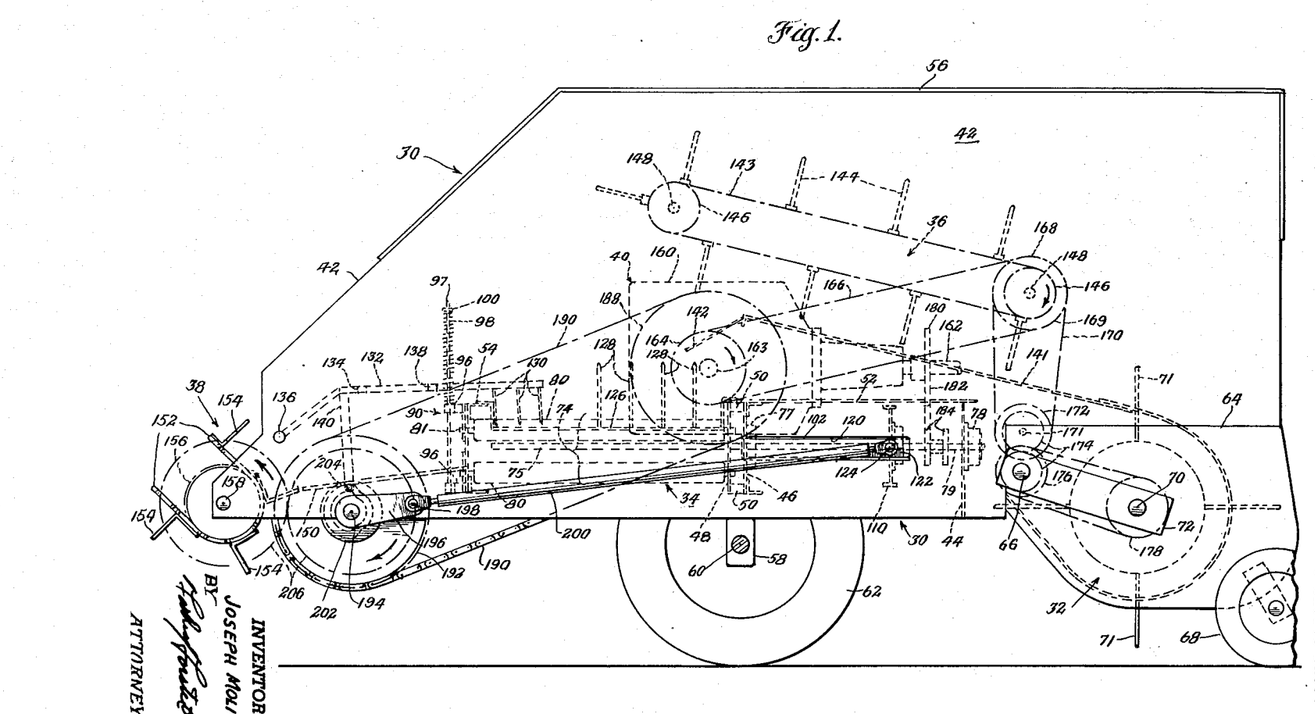
FIG. 1 is a right side elevation of the machine as a whole, in which its interior parts are for the most part shown in dotted lines.

30. This numeral as applied designates frame of machine (FIG. 1).

32. This numeral designates transversely arranged pickup mounted in the forefront of the frame.

Figure 2:
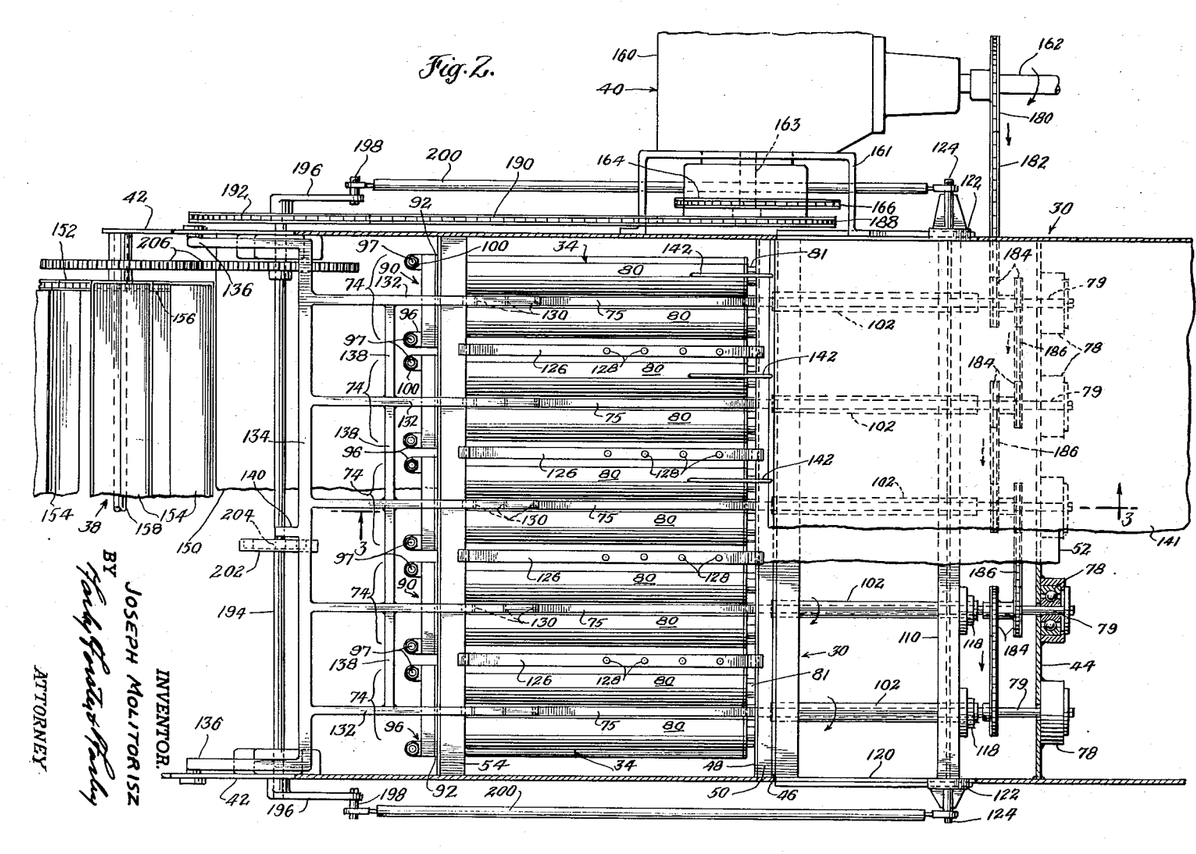
FIG. 2 is a plan view of the central part of the machine only, parts of both the front and rear of the machine being broken entirely or partially away, and the top of the housing being removed.

34. The longitudinally extending bank of hay roll forming and wafer making units supported in transverse alignment across the width of the frame 30. This bank lies to the rear of the pickup 32 (FIG. 2).

36. The conveyor for transferring hay from the pickup to points above the advanced ends of the bank of hay roll and wafering making units 34 (FIG. 1).

38. The wafer collecting assembly which receives completed wafers from the bank of units 34 and is located immediately behind it.

40. The power transmission system which connects through the various elements of which it is composed with all of the power driven elements of the other five assemblies (FIG. 2).

*The elements of the frame 30*

42. The wide platelike longitudinally extending side members of the frame which are extended upwardly to a considerable height to support the hay transfer means and the top of the machine housing. Longitudinal reinforcements such as side sills may be used coupled with suitable vertical reinforcements if desired and appropiately placed to take the required localized loadings, in which events the sides of the housing may be constituted of thin sheets rather than the side members of plate.

44. A front transversely extending frame member located immediately behind the pickup 32. This too is platelike in form but may be provided with reinforcements as desired.

46, 48. Closely adjacent intermediate transverse frame members, the member 46 of which is reinforced top and bottom by suitable transversely extending angles as shown.

50. Transversely extending box shaped tubes spacing apart members 46 and 48 and welded or otherwise secured to them thereby constituting frame members 46 and 48 together an extremely strong and rigid transverse frame member of box cross section.

52. A top longitudinally extending plate secured to each of the transverse frame members 44 and 46–50 and to side members 42, thereby interbracing all the parts which it connects (FIG. 1).

54. A rear transversely extending frame member whose construction and reinforcement is essentially similar to that of member 48.

56. The top of the housing extending from side to side of the upper portions of the side frame members 42 and preferably detachably secured (by means not shown) in order to facilitate its removal and permit access to the various operating assemblies contained within the frame and housing of the machine as a whole.

58. Wheel axle supports secured to and depending from the side frame.

60. The transversely extending wheel axle.

62. One of the main wheels from which the machine frame and assemblies which it carries are supported to be moved over a field. Only one each of elements 58, 60 and 62 is shown, and that in FIG. 1, but it will be understood that as in the usual course there will be provided one on each side of the machine.

64. The vertical adjustable frontal extensions of the side frame members 42 adjustable up or down with the standard pickup 32. Only one of these is shown and that in FIG. 1.

66. A transversely extending pickup drive shaft having bearings carried by the side frame members 42 and about which the frame extensions 64 are oscillably adjustable.

68. Pickup ground running wheels borne as usual by the adjustable frontal extensions 64 from the side frame 42. As is the cases of parts 62 and 64 only one wheel and one wheel support connecting with the side extension 64 is shown, and that in FIG. 1.

*Elements of the pickup 32*

70. The transverse shaft upon which the pickup is mounted and about which it revolves.

71. The standard pickup as revolved on shaft 70 equipped with tines as operated as usual (by means not shown).

72. The supporting arms 72 carrying bearings for shaft 70 pivoted adjustably as is the frame extension 64 about the pickup drive shaft 66.

*Elements of the centrally located bank of hay roll and wafer making units*

74. The five longitudinally extending units which make up the bank. They are arranged longitudinally of the machine in transverse alignment in an horizontal plane with their longitudinally extending axes parallel to each other. They extend between the transversely extending spaced intermediate frame members 46, 48 and 54, and are supported mainly by the bearings of their several elements carried by these frame members.

75. The elongated wrapping spindles.

Figure 3:
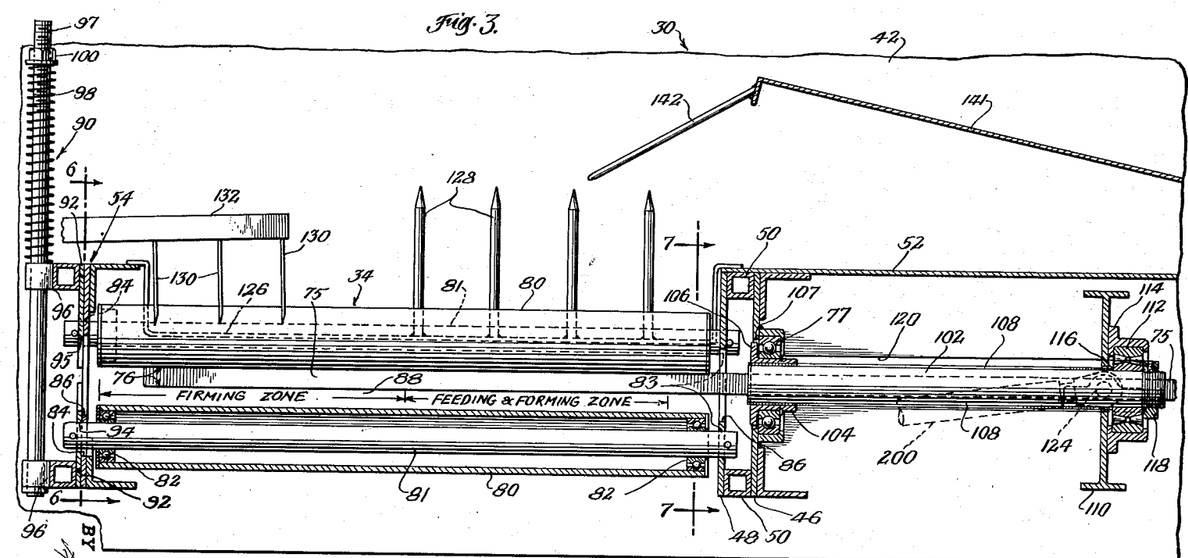
FIG. 3 is an enlarged section of one of the bank of units taken in its vertical plane of symmetry.

76. The four right angle corners of the uniformly square cross section of the spindles. The corners 76 constitute parallelly extending hay engaging ridges (FIG. 3).

77, 78. Widely spaced antifriction bearings carried respectively by the frame members 46 and 44 and cantileverly supporting the wrapping spindles (FIG. 1 and 3).

79. The extreme front ends of spindles 75 which are reduced to circular section for accommodation in bearing 78 and for the reception of driving sprockets. Substantially the entire lengths of the spindles from bearings 78 to their free rear ends are of the square cross section. Spindle support by bearing 77 is afforded through the reciprocating means for moving the hay through the unit presently to be described.

80. The several annular series of tubular sectioned feeding and forming, and firming rolls tangential to the spaces to be occupied by the hay rolls formed by the units (FIG. 2).

81. The axial shafts which support the rolls 80 (FIG. 3).

82. Anti-friction bearings between the tubular sectioned rolls 80 and these shafts 81.

83, 84. Respectively the circular and the somewhat radially elongated roll shaft bearing holes in intermediate frame members 48 and rear frame members 54. Small transaxial round holes in the extremities of shafts 81 are used to indicate pins or cotters for axial shaft securement.

Figures 5, 6, 7, 8:
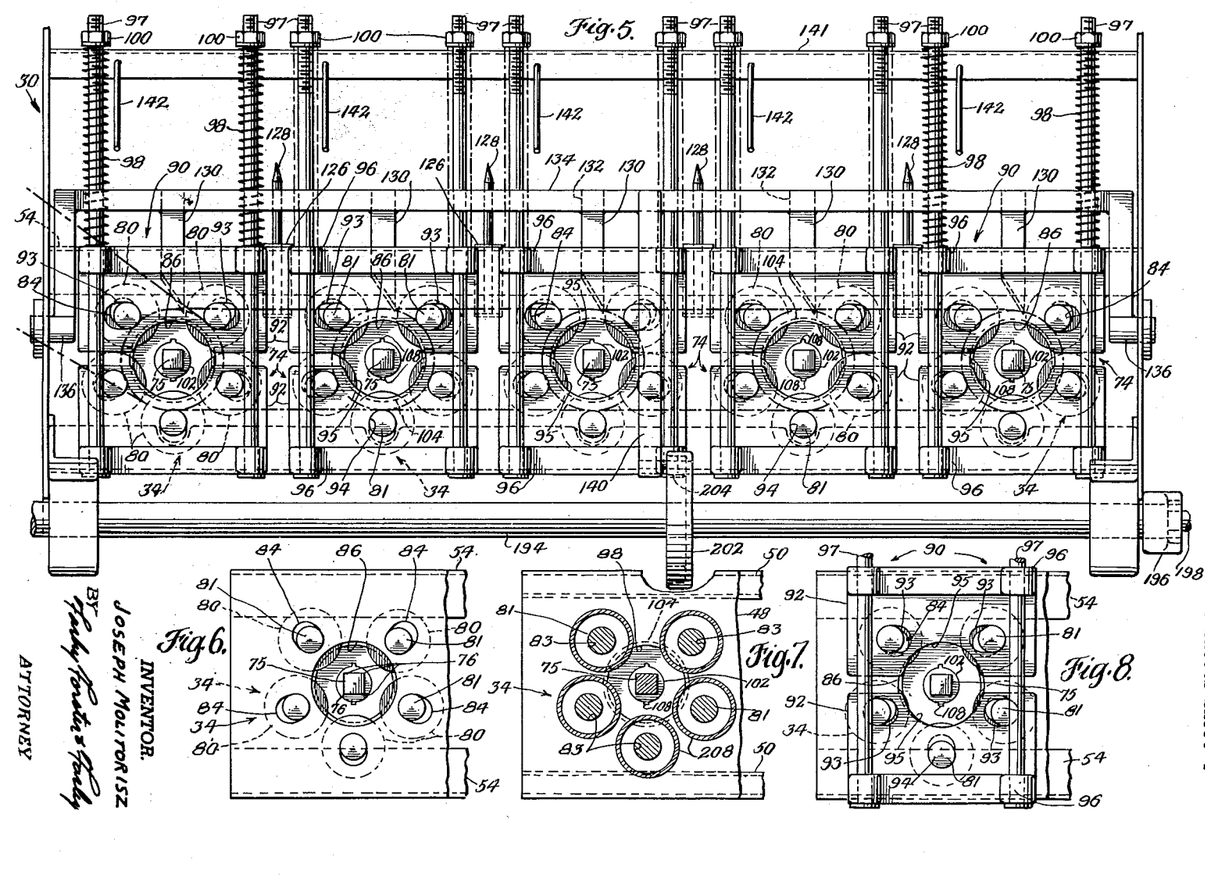
FIG. 5 is a rear end elevation of the bank of units.
FIG. 6 is a face view of a rear roll bearing plate taken as indicated by the arrow 6—6 in FIG. 3.
FIG. 7 is a transaxial unit section on the line 7—7 of FIG. 3 looking forwardly.
FIG. 8 is a face view of the rear end of a unit similar to one of those shown in FIG. 5, but showing the rollers adjusted to their extreme radially outer positions instead of to their extreme radially inner position as shown in FIG. 5.

86. Enlarged circular apertures centered on the axes of spindles 75 provided in each transverse frame member 48 and 54, to permit the hay roll and wafer passage as moved rearwardly (FIGS. 5 and 6).

88. The substantially cylindrical space occupied by the cylindrically shaped hay roll and wafers. This is, of course, of smaller diameter than the diameter of the apertures 86 through which they pass (FIG. 7).

90. An assembly of parts one for each unit, occupying a generally vertical plane immediately adjoining the plane of transverse frame member 54 for adjusting the firming, forming and the compression of the rolls 80 upon the hay rolls being formed (FIGS. 3, 5 and 8).

*Identification of the assembly parts follows*

92. Upper and lower adjusting plates of substantially the same size spaced apart in their common plane adjoining the plane of member 54 in which the radially elongated bearings 84 for the shafts 81 are provided (FIG. 5).

93. Horizontally somewhat elongated supplemental shaft bearing holes in members 92 through which the rear extremities of the four upper shafts 81 project.

94. A circular bearing aperture centrally located in the lower member 92 accommodating centrally the lowermost of the shafts 81. At this point note that there is no corresponding upper roller and the two uppermost rollers of the annular series of each unit are angularly more widely spaced apart.

95. Arcuate cutaways centered in the vertical plane of symmetry of members 92 and of a radius sufficiently large to permit the passage through and between the plates 92 of the firmed hay roll or wafers as the case may be.

96. Rearwardly projecting thick lugs or bars aligned horizontally across the respective upper and lower edges of the upper and lower adjusting plates 92.

97. Long vertically extended adjusting rods passing freely through these lugs or bars 96 parallel to each other and outside of the annular series of roll supporting shafts 81. They have headed lower ends bearing against the under surfaces of the lower lugs or bars 96 and extended and threaded spring bearing upper ends.

98. Relatively heavy compression springs about the upper ends of the rods 97 which bear by their lower ends upon the upper sides of the upper lugs or bars 96.

100. Adjusting nuts 100 threaded onto the upper ends of the rods 97 and bearing down upon the upper ends of the springs for adjustment of their compression.

102. A reciprocable member telescoped about the between bearings cross section of the wrapping spindle 75 and operable to push hay roll portions wrapped about the spindle 75 in its feeding and forming zone adjoining bearing 77 from that zone rearwardly into the adjoining firming zone. See FIGS. 2, 3, 4 and 5 particularly and in the latter note the cross section of this member 102. It is rectangularly apertured for its telescoping about the spindle though it is generally of circular cross section and of considerable wall thickness (FIG. 3).

104. A flanged collar intervened between the periphery of the pusher member 102 and the inner race of spindle bearing member 77. The flange is on the rearward side of the collar while an un-numbered resilient retaining ring is shown in rectangular section as confining the collar to the bearing 77. The bearing 77 is of a combined radial and thrust type inasmuch as it rotatably supports the spindle and member 102 yet must resist the friction of member 102 as it is reciprocated axially to move the hay roll from the one zone to the other.

106. The flange referred to in connection with the collar 104. This lies in the plane of cross frame member 46, and is approximately of the diameter of the formed hay roll.

107. A circular aperture in cross member 46 within which flange 106 rotates.

108. Diametrically opposite key like ribs (FIGS. 3 and 5) which extend from the after end of the hay roll moving member 102 almost to its front end. As clearly appears in the end view of FIG. 5 these ribs 108 are accommodated in key slots in collar 104 to rotate the axially fixed collar 104 and its flange 106 with pusher 102 and spindle 75. Axially fixed rotating flange 106 constitutes a stripper. The angular corners of ribs 108 serve as hay engaging longitudinally extending ridges in the same manner as do the corners 76 of the rectangular cross section of the spindle 75 itself.

110. A transversely extending deep I-beam connecting commonly with all of the hay roll pusher members 108 and is freely reciprocable between the side members 42 of the frame of the machine and within the space between transverse frame members 44 and 46. It simultaneously actuates all of said members 108.

112. Combined radial and thrust bearings of the antifriction roller type secured to the web of the member 110 and through which the connections with members 102 are made. The connection is effected by removing the ribs 108 at the front end of member to permit the inner race of the bearing to abut against the ends of ribs 108. The diameter of the pusher member may be reduced to form an annular bearing shoulder if desired. The extremities of members 102 are threaded.

114. Retainer for bearings 112.

116. These are the abutting rib ends referred to.

118. Nuts threaded onto the extremities of members 102 in each case and bearing against front side of the inner race of the bearing.

Figure 4:
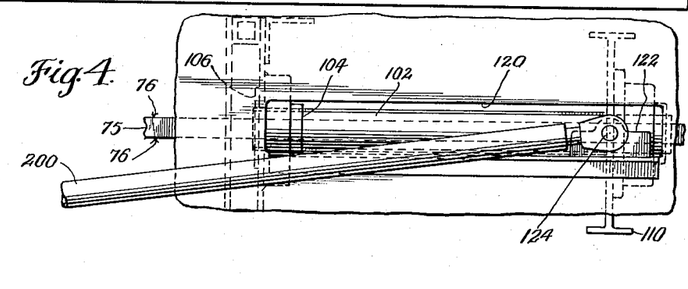
FIG. 4 is an enlarged side elevation view of the means for moving the hay roll from the hay roll feeding and forming zone to the firming zone.

120. Slots somewhat in excess of the length of the reciprocating stroke of members 102, formed on the opposite side members 42 of the frame (FIG. 4).

122. Extensions in the form of slides of rectangular cross section reciprocable in the plane of slots 120 and welded to the ends of the reciprocable I-beam 110.

124. Pin like extensions of the slides 122 adapted to receive connections with the power transmission system of the machine.

126. Longitudinally extending feed separator supporting bars intervened between the several units 74 of the bank units. These bars as can be seen in FIG. 3 in dotted lines lie below the tops of the topmost rollers 80 but have upturned and outbent ends by means of which they are rested upon and secured to transverse frame members 48 and 54.

128. Spaced vertically extending pins with sharpened upper ends welded to the body of bar 126 within the feeding and forming zone of the units and to inter-unite infed hay separating means.

130. Radially acting wafer severing knives or saws spaced wafer axial length or thickness apart in an axial series extending from the rear over but the after part of the firming zone.

132. Overlying axially extending bars to which the axial series of severing means 130 are connected. Both these bars and the severing means 130 which they support operate substantially in the longitudinal planes of symmetry of the units and within the widened angular spaces between their topmost rollers 80.

134. A transversely extending bar or beam to which knife supporting bars 132 are commonly connected for common actuation. The extremities of this bar adjoining the side frame members 42 are downwardly and rearwardly bent, as shown in FIGS. 1 and 2.

136. Out turned extensions, from the lower ends of bars 134 of circular cross section which are suitably journalled in appropriate bearings in rearward extensions of side frame members 42. So pivoted bars 134, 132 and the knives 130 can be reciprocally oscillated.

138. Transversely extending braces between the knife supporting bars 132 aligning and reinforcing them.

140. A downwardly extending approximately centrally located extension from common transverse supporting bar 134 the lower end of which is adapted for the application of power for actuation of the knives 130.

Such are the constitution element by element of the bank of units 34 and the individual units 74.

Elements of the hay transfer assembly 36

141. A hay feed delivery apron extending from pickup 32 to the bank of hay roll forming units 34 (FIG. 1). It is secured to and supported from the side frames 42. While it extends in the horizontal direction, it is inclined upwardly to reach a level above the front ends of the bank of units 34 for the purpose of delivering hay from the pickup to the units 74 of the bank from above their feeding and forming zones.

142. A series of downwardly inclined tines affixed by welding or otherwise to the after edge of apron 141 to further longitudinal distribution of hay within the feeding and forming zones of the units 74 (see FIGS. 1–3 and 5).

143. A chain or belt conveyor arranged transversely of the casing (shown only in FIG. 1 and in dotted lines) to aid the transfer and transverse distribution of hay over apron 141 to the bank of units 74. It operates over an area in excess of the length of apron 141 but substantially parallel thereto. Its after end extends somewhat beyond the after end of apron 141 and its tines 142 for farther longitudinal distribution of hay fed to the feeding and forming zones of the units 74.

144. The flights of the conveyor 143 which directly engage and propel the hay moving over the apron 141.

146. Rollers or sprockets which carry the belt or chain 143 of the conveyor.

148. Transversely extending roller or sprocket bearing shafts whose opposite ends are journalled in the respective side frame members 42.

Elements of the wafer receiving and conveying system 38

150. A wafer receiving apron horizontally extending but somewhat downwardly inclined toward the rear having a front edge supported from and attached by suitable means to the transverse frame member 54 just below the top of the lowermost rollers 80 of the bank 34 and having its ends supported by and attached to side frame members 42.

152. An upwardly extending wafer conveying system of the chain conveyor type.

154. Trough shaped wafer receiving conveyor pockets of angular cross section carried by the chain and extending from side to side of the bank 34 of units 74 and having closed ends. They move counterclockwise and upwardly to collect wafers as they roll or slide down the apron 150 and convey them upwardly to a following wagon.

156. The chain sprockets.

158. The chain sprocket bearing shaft journalled in the rearward extensions of side frame members 42.

Elements of the transmission power transmission system 40

160. A gear box of usual constitution into which power from a suitable source (either power take-off or an independent motor), is transmitted and through which the appropriate revolutions of the outgoing shafts are derived (FIG. 2).

161. A stool or framing through which the gear box is supported from the left-hand side frame member 42.

162. A broken off incoming shaft connection from a source of power.

163. The transversely extended outgoing power shaft from gear box 160 appearing in dotted lines in FIGS. 1 and 2.

164–178. These numerals designate in the order in which they appear in FIGS. 1 and 5 the train of power transmitting elements such as sprockets, chains, jack shafts and gears, from outgoing gear box shaft 163 reaching first to conveyor 36 through its drive shaft 148 and from there reaching to pickup shaft 70. These elements appear so clearly in FIGS. 1 and 2 and their manner of operation is as commonly understood as to need no detailed description.

180. A sprocket on power shaft 162 for supplying power for rotation of spindles 75 and pushers 102 (FIG. 2).

182. A transversely extending chain.

184. A pair of hub connected sprockets of the same diameter keyed to spindle shaft extension 79 of the leftmost units 74 of the bank 34 of hay roll forming and wafer making units. Chain 182 is trained over one of this pair.

186. A series of inter-unit chains through which power is transmitted from unit to unit through hub connected double sprocket 184 keyed to the respective shaft extension 79 throughout the series from left to right across the machine.

188. A relatively large diameter sprocket on shaft 163 also on the left-hand side 42 of the machine frame, located between sprocket 166 and the frame.

190. A power transmitting chain running over sprocket 188 and extending rearwardly and downwardly.

192. The mating sprocket over which chain 190 runs.

194. A transversely extending through running power shaft suitably journalled in the lower portion of the rear of the side frames 42 receiving power through sprocket 192.

196. Parallelly extending rather long cranks mounted on shaft 194 to be rotated from the outwardly extended ends of the through running shaft 194.

198. Crank pins at the outer ends of these crank arms 196.

200. Parallelly extending connecting rods pivotally affixed at their respective ends to crank pins 198 and to pins 124 outwardly extended from slides 122 for reciprocating the transversely extending I-beam 110 which actuates the pushers 102. The cranks 196 are each equal in length to one half the stroke required of the pushers 102 and a connecting rod 200 are of equal length, so achieving a full storke of the pushers of all five units.

202. A face grooved cam mounted on shaft 194 to be rotated thereby and located near its center (FIG. 2).

204. A cam follower running in the face groove of cam 202 and pin mounted upon the lower end of the downwardly projecting frame extension 140 of cutter mounting and actuating bar 134. As can readily be seen from the dotted line showing in FIG. 1, the shape of the cam groove and its relation to cranks 196 is such that during the clockwise rotation of the shaft 192 as indicated by the arrow, the wafer severing knives 130 are held out of engagement with the firmed hay rolls during adverse stroke of pushers 102 but are carried through their cutting stroke during the reverse stroke of the pushers.

206. A pair of intermeshing gears respectively keyed to shaft 194 and shaft 158 by means of which wafer receiving and conveying troughs 154 are actuated, to move upwardly as indicated by the arrow in FIG. 1.

The operation of the machine

With the above-detailed description of the physical characteristics of the assemblies and their elements and their respective functions and relationship to each other, both the overall and the detailed operation if not already clear can readily be made clear. The diagram of FIG. 9 indicates by its line of heavy arrows the flow of hay from windrow to loading wagon through the several assemblies which act upon it. These assemblies and their actions are identified by assembly numbers and by the legends, and the several symbolic representations of the nature of the action. Thus, the arrows applied to the dashes of the dotted line successively follow the action of the pickup in the pickup area, the action of the apron and the associated conveyor in the hay transfer area, the action of wrapping as symbolized by the helix extending axially of the feeding and forming zone, and the action of the pusher which enters it intermittently, the radial pressure being supplied through the rolls in the firming and compressing zone by the arrows applied to the incomplete circular lines, their broken curvatures symbolizing the absence of wrapping action and the existence of compressing action; and the arrows applied to the downwardly inclined receiving platform for the wafers show their progress down this platform to the loading conveying area, and, by the symbolized wafer receiving trough, the action of the conveyor in loading of the completed wafers upon a following wagon.

The prolongation of the conveyor extends beyond the after edge of the apron and also beyond the points of the tines 142, and so serves with the rearward extension of tines 142 in achieving axial distribution of hay fed to the rolls. The rows of upstanding pins 128 between the several units 74 serve to more uniformly axially divide between the several units, the hay thus being transversely and axially distributed. The hay so distributed and divided is received by each unit between its two topmost rolls 80 in the widened space between them heretofore pointed out. Hay reaching the ridges constituted by the edges 76 of the spindle cross section and those ridges constituted by the edges of the ribs on the pusher 102 is immediately wrappingly engaged and the wrapping of a roll commences and continues along the entire axial length of the feeding and forming zone as indicated by applied legends in FIGS. 3 and 9. If the feeding and forming zone is empty of hay when operation of the machine is first commenced initiation of the feeding action of the spindle and coacting rolls can be hastened if desired by pushing incoming hay down between the uppermost rolls 80 and so into spindle and pusher engagement.

Figures 10, 11:
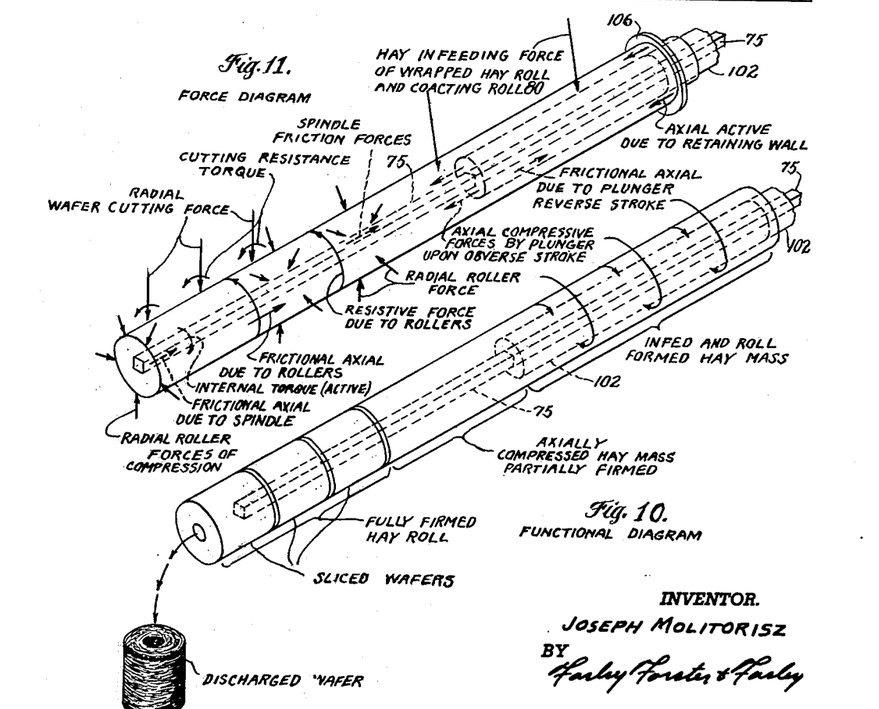
FIG. 10 is a functional diagram in which a formed and firmed hay roll and several wafers are shown in perspective along with the spindle about which they have been made and the means for pushing the hay roll along the spindle, the applied legends indicating the functions which have been performed in the making of them and with the showing of brackets the zones in which the indicated functions are performed.
FIG. 11 is a force diagram, showing except for the wafers the same perspective of parts as FIG. 10, but utilizing force representing arrows and legends applied to them to characterize the forces involved in the functionings of the hay roll and wafer making.

Once wrapping is commenced, feeding, wrapping and forming action continues strongly because incoming hay is then caught and fed by a nipping action between the hay already wrapped about the spindle and pusher and one of the uppermost rolls 80 and the next lower roll which is frictionally engaged and rotated by the incoming hay, as indicated in FIG. 5 by arrows applied to the unit shown in full lines on the left and similarly in FIGS. 6, 7 and 8. The strength of this nipping action is the greater by reason of the strength of engagement of the extremely rough and irregular periphery of the hay roll being formed and of the faces of the infeeding mat of hay caught in the nip. Member 102 as it moves a hay roll from the feeding and forming zone into the firming zone is increasingly wrapped with hay. Revolving stripper flange 106 strips the wrapping from pusher member 102 off and onto the body of the spindle 75 when pusher 102 makes its reverse stroke; and further wrapping is superimposed upon the stripped wrapping progressively collapsing and compressing its turns upon the spindle body as fast as it is transferred thereto from the pusher member 102. Such additional wrapping and resultant collapsing and compressing action is continued as the roll so formed is moved into the firming zone by succeeding obverse strokes of member 102, thus progressively completing the geometric form of the hay roll as it is moved. The axial frictions of the formed hay roll upon the body of the spindle and upon the surfaces of the rollers resist the roll moving force of the pusher 102. These frictions plus additional radial compressive forces applied to the rollers through the compression springs 98 which motivate the roll adjusting mechanism 90 to move the rollers 80 radially inward toward the axis of the unit result in axial foreshortening of the roll as initially formed in the feeding and forming zone. As a result the roll so formed is substantially compressed both axially and radially when it reaches the means 130 for severing the roll into wafers. Reference is made to FIGS. 10 and 11 which depict in perspective from end to end formed and firmed hay roll bodies about spindle 75. FIG. 10, a functional diagram, and FIG. 11, a force diagram, through their legends make the above-described actions clear. Because a firming zone merely of the length of the foreshortened roll would not provide dwell of the roll body in that zone a sufficient time for adequate firming, the total length of the firming zone is made very considerably greater than the foreshortened length of the formed hay roll, and the cutting means 130 are extended axially from the rear of the firming zone but a part of the zone length, so insuring full firming before wafer severing.

The operation of the wafer receiving platform 150 and loading conveyor need no description.

The wafers' physical characteristics

Figures 9, 12:
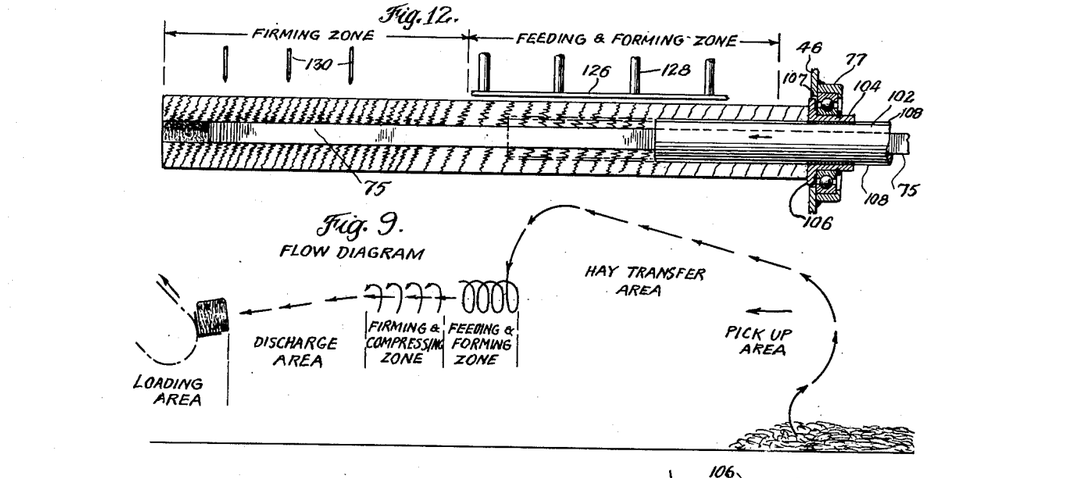
FIG. 9 is a diagram showing by the course of a line of heavy arrows the flow of hay through the machine from a windrow in a field to the finished and collected hay wafers.
FIG. 12 is an axial cross section of the hay roll and associated parts depicted in the diagram of FIG. 11 taken in the vertical plane of symmetry of the parts, and also showing in elevation one of the inter-unit hay separating devices zone, and the lower portions of certain of the cutting means.

With the foregoing description of the general operation, and FIGS. 10 and 11 understood, the axial cross-sectional showing of FIG. 12 should make clear the manner in which the physical characteristics of the wafer, the subject of the product application above referred to, are achieved. In the axial cross section of FIG. 12, I show the condition of the full length of the hay roll body upon the spindle 75 and pusher 102 at the half of the obverse stroke of the pusher 102 which moves the geometrically formed hay roll from the forming to the firming zone. I used to make this showing cross-hatching lines which are variously spaced from each other axially and whose radially inward portion is waved or crinkled to varying degrees. Variations in the axial spacing of the lines is utilized to indicate jointly the amounts of hay wrapped about the spindle and pusher from which the hatching lines emanate. The varied amplitude and radial extent of the crinkling or waving of the cross-hatching lines is used to indicate the different degrees of collapse upon the body of the spindle of the wrapping turns originally of larger diameters as they are forced radially inwardly by added wrappings in the forming zone and by increasing compression in the firming zone.

With these symbolisms in mind, observe that the cross-hatching upon the portion of pusher 102, which has entered the feeding and firming zone up to the half of the obverse or hay roll moving stroke, is not possessed of any waviness whatsoever, indicating that there is little collapse of wrapping turns if any upon the relatively large diametered pusher which is telescoped about the smaller sectioned spindle (see FIG. 5). The wider spacing between the cross-hatchings adjacent the stripper 106 indicates that the portions of the pusher 102 most recently emerged into the feeding and firming zone have received less wrapping than those portions nearer roll pushing end of the pusher 102. The yet closer proximity to each other of the hatching lines in the after half of the feeding and forming zone indicates the build up of the radial compression due to added wrappings and the force of the pusher 102 acting against the frictions of the spindle and the surrounding rolls which resist movement of the hay roll by the pusher. Within the forepart of the adjoining firming zone the progressively decreased spacing of the hatching is utilized to indicate the progressive increase in roll density resulting jointly from a progressive increase of axial compression by pusher 102 and progressively increasing radial compression from compression springs 98 as the pre-formed portions of the roll are moved toward the after or wafer severing end of the zone. The decreased amplitude and increased radial length of the crinkled portion of the hatching is utilized to indicate the increased firming and stabilizing of the roll in the firming zone through the increasing radially inwardly exerted forces of the surrounding angular series of rolls.

The physical characteristics of the wafers derive from these described behaviors of the turns of the wrappings. The lower density of the inner portions of the wafer result directly from the described collapsing of the larger turns of the wrapping and the resultant crinkling. The wrappings become crinkled initially under the binding force of the first of the wrappings following stripping from the body of the pusher to the body of the smaller sectioned spindle and initially form a relatively springy mass. Each wrapping which follows not only increases radial compressive pressure upon the crinkled mass transferred from the pusher but also progressively decreases the diameters of the turns of preceding wraps as the springiness is progressively decreased by the increased binding forces, with the result that the crinkling travels radially outwardly and toward the outer periphery of the roll but at decreasing amplitudes. The final wrappings do not, of course, have their turns collapsed because the inner masses as their springiness is markedly decreased markedly resist further collapse. Thus, the lengths of the crinkled portions do not show much increase after pusher 102 has completed its observe stroke and the hay roll formed is all moved into the firming zone.

This same initial and progressive collapsing of the turns plays an important part in the attainment of wafers whose average densities may be readily confined to an intermediate range such as twenty to thirty-five pounds per cubic foot and in which condition the wafers are yet permeable to air to a desirable degree. Both this latter attribute of lesser densities on the interior than upon the exterior endow the wafers with better drying qualities.

The greater degree of density of the outer portions of the wafers is due to the length of time the body of the hay roll remains in the firming zone and the continued and progressively increased compression of the firming rolls. This increases as the body of the roll is moved toward the rear end of the units, is augmented by such slippage as occurs between the hay roll and the firming rolls, and brings about greater tightness and closeness of stems and leaves of the outermost wraps.

The mechanical interlocking of the stems and leaves already crossed the intertwined in the windrow and by machine pickup and transfer action on the infeeding hay is achieved jointly by the various degrees of crinkling above described coupled with the relatively high degree of compression of the roll and the length of time this compression is continued. The closer axial pushing together of the crinkling of leaves and stems under the force of axial compression exerted by the pusher 102 against the frictional resistance of spindle and rolls, additionally furthers this interlocking.

Interlocking and stabilization are both furthered by the fact that while the wrappings are at times truly at right angles to the hay roll axis, they are, when received by pusher 102, drifted at various acute angles rearwardly when the pusher is on its obverse stroke and forwardly when the pusher is on its reverse stroke.

Exudation of juices from the stems and leaves, its coagulation and drying in the peripheral surfaces and immediately adjoining portions of the hay roll body within a firming zone whose length invites these conditions under high speed rotation, aids in stabilizing and binding its exterior firmly and smoothly together.

The end result is wafers cut from the roll which can be loaded, transported, dried further if necessary, and stored without disruption.

*Modifications*

While specifically devised to produce wafers of the characteristics described above, obviously the same machine may be utilized to produce hay wafers of either more moderate or of extreme densities should such be desired. However, wafers of the extreme densities have thus far proven difficult to dry thoroughly owing to their greatly lessened permeability to drying air, and when not dried to an appropriate moisture level wafers are often found to mold. Wafers of extremely low density lack stability.

The advantages attendant upon properly determined relative lengths of the hay feeding and forming zone, and the firming zone, appropriate speeds of rotation, and the necessary heights of compression have already been referred to. My invention comprehends such adjustments.

Instead of compression springs such as 98 for yieldingly pressing the rollers to the body of the rolls faced with suitable thicknesses of rubber or Teflon may be used as indicated at 208 in FIG. 7.

Figure 13:
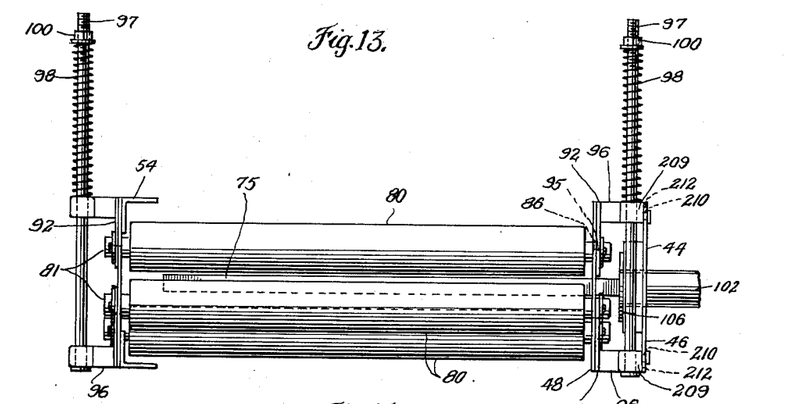
FIG. 13 illustrates a modification showing in side elevation an annular series of rollers of a unit in which the rollers are adjustably spring pressed toward the axis of the unit at both their ends instead of at their rear ends only as in FIGS. 1–3 and 5.

FIG. 13. This is a modification of the mounting of rollers 80 at their front ends to provide at these ends means like means 90 at the rear for adjustably yieldingly pressing them radially toward the axis of the formed hay roll and the spindle 75. Similar and similarly functioning parts are numbered correspondingly to those in FIG. 5. At the front end beam members 46 and 48 are spread somewhat farther apart than in FIG. 3, member 48 is independently secured to the side frame members 42, and spacers 50 are omitted. The vertically spaced plates 92 carrying the transversely extending slots about the extended ends of the spindle are located closely adjacent the front face of transverse beam member 48, and the coacting radial bearing slots, such as 84 in FIG. 5 (not shown in FIG. 13) are cut in member 48. Lugs 96 are longitudinally elongated forwardly, shouldered at 209 to slide against the rear face of 46, and provided with reduced end extensions 210 projecting through vertical slots 212 in beam member 46 which are of a length sufficient to provide the necessary vertical adjustment as shoulders 209 slide into contact with the rear face of beam member 44 under the urge of springs 98.

Figure 14:
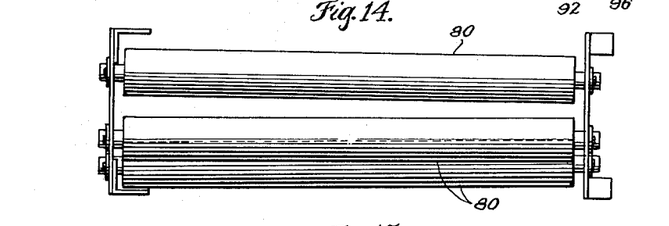
FIG. 14 is a similar side elevation to that of FIG. 13 wherein rollers mounted in such manner that their axes and correspondingly the space which they surround, are somewhat divergent from their front end to their rear ends.

FIG. 14. A modification consisting of an annular series of annularly extending surrounding rolls 80 whose axes diverge from front to rear. This slight divergence reduces the axial force required of the pusher to move the formed hay rolls from the feeding and forming zone to the firming zone. In this case, however, while sufficient compression and firming of the outermost wraps to attain stability of the formed wafers, the average density of the wafers is not heightened to the same degree as in the case of parallel axes rolls. Rolls having fixed axes are shown in this modification. Under such fixed axial mounting converging axes rather than diverging axes may be used if progressive increase of density is desired. Such convergence can be brought about simply by turning the unit end for end. Rolls of the same diverging or converging axes may also be provided with yielding variable compression adjustment.

Figure 15:
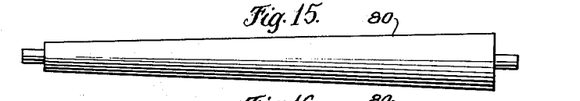
FIG. 15 is a side view of a single roller on a showing in a somewhat exaggerated degree a tapering of a roll diameter from a relatively large diameter at the front end to relatively smaller diameter at its rear end.

FIG. 15. Here I illustrate by a single roll modification of the individual rolls of a series to afford decreasing diameter from front end to rear end. An annular series of such rolls if their axes be parallel will accomplish reduction of the axial force required of the pusher to move the hay roll from the one zone to the other. While an exaggerated taper is illustrated but slight taper may prove more desirable at times. As in case of the modification of FIG. 14, the opposite effect can be produced by giving the roll increasing diameter from the front end to the rear.

Figure 16:
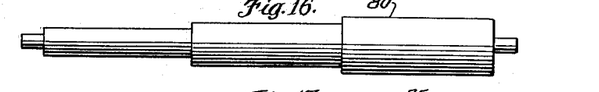
FIG. 16 is a similar side elevation of a single roller showing its diameter stepped down axially at intervals from a relatively large diameter at its front end to its relatively smaller diameter at its rear end, the change in diameter being also somewhat exaggerated.

FIG. 16. Illustrated in this figure is a single roll of a series axial steps down in diameter at intervals of its axial length from a large diameter at the front end to a smaller diameter at the rear end through in this case of but one intermediate step. Such rolls cannot be reversed in function as can be the rolls illustrated in FIGS. 14 and 15.

Figure 17:
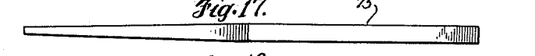
FIG. 17 is a side elevational view of a wrapping spindle tapered down toward its free end.

FIG. 17. This depicts a spindle 75, a portion of whose length lying within the firming zone adjoining its free end is progressively reduced in cross section. Such tapering of the spindle will also reduce the axial force required to move the roll. Again the taper has been exaggerated. It may be made more or less as desired.

Figure 18:
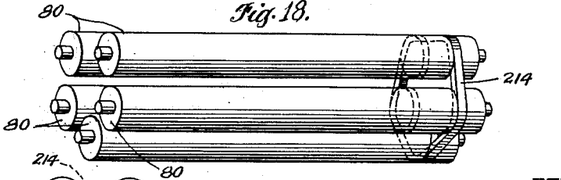
FIG. 18 shows in perspective a unit whose annular series of rolls is geared together by a common belt.

FIG. 18. I have found it advantageous in some operations of the machine of FIGS. 1 to 8 in which peripheral engagement by the formed and firmed hay roll is utilized both to drive the compressing rolls and also to nip feed hay into the wraps, to gear all the rolls of a given unit together, as by the single circumscribing belt 214 illustrated in this figure, or by other means.

Figure 19:
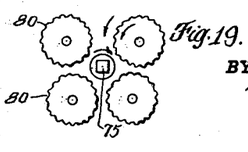
FIG. 19 shows in end elevation a four roll annular series whose peripheries are annularly axially ridged.

FIG. 19. Here I delineate a four roller substitution for the five roll units of FIGS. 1 to 8. A widened spacing of the two uppermost rolls to facilitate start of wrapping and feeding action is retained. Further in this modification I provide the rolls with axially parallel ridges or corrugations for the purposes of increasing their driving engagement with the periphery of the wrapped hay roll and furthering the feeding action between the hay roll and the forming rolls. As in the instance of the FIG. 18 the four rollers may be geared together by a belt 214 or equivalent means such as sprockets and chains.

Figure 20:
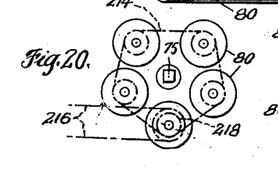
FIG. 20 shows in end elevation a five roll annular series not only geared together but also power driven.

FIG. 20. Such a chain and sprocket arrangement is symbolized by the dash and dot line in FIG. 20. The outstanding modification of FIG. 20, however, consists in power driving of the rolls of the unit as so geared together through a power driven chain and sprocket connection 216 and 218. Such a power driven geared together unit can be so driven from either the rear of a bank of units such as 32 or the front of the bank, the drive being extended from unit to unit 74 of the bank by bridging chain connections from one sprocket 218 to the next in order of the bank and functioning as do the interunit drives 184 and 186 of the spindles (see FIG. 2). My preference is to locate such a drive at the front end of the bank 32, and so avoid interference of the interunit chains with wafer cutting and discharge, or receiving and loading elements. Moreover, location under beam interconnecting plate 52 appropriately houses in the drives.

While a specific preferred method and machine embodiment as well as a number of modifications in the hay roll forming apparatus per se have been illustrated and described above in detail, it will be understood that numerous further modifications could be resorted to without departing from the scope of my invention as defined in the following claims.

I claim:

1. A machine for making rolled units of hay comprising a rotatable hay wrapping spindle having a free discharge end, hay roll feeding and forming means for directing hay to and confining its becoming wrapped about the spindle to form a compressed hay roll of limited diameter, means for exerting an axial force upon the hay roll to move it along the spindle, and reciprocable means operative in a direction normal to the axis of said spindle after said axial force has moved said hay roll along the spindle for subdividing the hay roll into unit lengths while it remains on said spindle.

2. A machine according to claim 1 in which the cross section of the spindle is provided with longitudinally extending hay engaging ridges substantially parallel to its rotational axis.

3. A machine according to claim 1 in which the cross-sectional area of the spindle becomes less at its free end.

4. A machine according to claim 1 in which the spindle is perimetrically notched near its free end to permit the dividing means to be extended within its perimeter.

5. A machine according to claim 1 in which the spindle is a cantilever supported by bearings spaced widely apart and accommodating in such space the means for moving the hay roll axially along the spindle.

6. A machine according to claim 1 in which the cross section of the space which may be occupied by the hay roll between the spindle and the co-acting feeding and forming, and co-acting firming means becomes progressively greater as the free end of the spindle is approached.

7. A machine according to claim 1 in which the means co-acting with the spindle is a nest of forming and firming rollers substantially surrounding the spindle, rotatable on axes generally parallel to the axis of the spindle, and having a length substantially co-extensive with the freely extending length of the spindle.

8. A machine according to claim 1 in which the means for moving the formed hay roll from the forming to the firming zone is located upon and rotated by the wrapping spindle, thereby itself receiving a wrapping of hay.

9. A machine according to claim 8 in which the hay roll moving means is reciprocable, and an axially immovable but rotatable stripper of hay wrapping surrounds the means for moving the hay roll, is rotated thereby, and strips the said wrapping onto the spindle body during reverse reciprocations, and an inboard cantilever bearing for the spindle back of said stripper.

10. A machine according to claim 1 in which the means for moving the hay roll from the one zone to the other is a reciprocating means telescoped about the spindle, and the spindle is a cantilever supported by spaced inboard and outboard bearings between which said hay roll moving means reciprocates, the inboard of which bearings supports said spindle through the telescoped reciprocating moving means while the outboard of said bearings supports it independently thereof.

11. A machine according to claim 8, in which the hay roll moving means reciprocates into and out of the feeding and forming zone and the feeding and forming means continue their joint functioning throughout both its reverse and its obverse reciprocations, whereby the hay roll but partially completed during reverse reciprocation of the moving means is completed during its obverse reciprocation and as completed is moved into the firming zone.

12. A machine embodying a multiple number of machine units functioning as specified in claim 1, which units are aligned lengthwise alongside each other, together with separate but common transaxially engaging actuating means for each corresponding group of elements subject to functional movements.

13. A machine according to claim 12 in which a hay feeding means including a feeding member transaxially spanning the feeding and firming zones of the units is located in a plane above the driven end of the spindles, and those transaxially engaging actuating means which engage groups of elements actuated from or near this driven end extended transaxially beneath the said feeding member.

14. A machine according to claim 7 in which the hay roll forming and firming rolls are frictionally driven from the spindle driven formed and firmed hay roll.

15. A machine according to claim 7 in which the hay roll forming and firming rolls are frictionally driven from the spindle driven formed and firmed hay roll, and in addition are drivingly connected to each other.

16. A machine according to claim 7 in which the hay roll forming and firming rolls as well as the spindles are power driven.

17. A field machine for making cylindrical units of hay picked up from the field comprising a longitudinally extending machine frame adapted to be longitudinally moved over the field, a transversely arranged hay pickup mounted at the forefront of the frame, a multiple number of hay rolling machine units constituted and functioning as specified in claim 1 carried by said frame to the rear of said pickup alongside of each other and longitudinally in transverse alignment with the feeding and forming zones nearest said pickup, hay transfer means between the pickup and the feeding and forming zones, transversely extending driving means for certain elements of the multiple units which driving means are located below said hay transfer means, hay unit collecting means below the spaces occupied by the formed hay rolls and behind said machine units, transaxially extending means for actuating the cutting means, and power transmitting means connecting to each and all said driven elements.

18. A machine according to claim 7 in which said rollers surround tangentially a coaxially extending substantially cylindrical space of substantially the same diameter as the desired hay roll and adapted to be occupied by a trans-axially wrapped hay roll of such diameter which is formed and firmed under the sequential action of the feeding and forming, and firming rollers, the feeding and forming being substantially confined to a limited axial zone adjacent one end of said series of rollers, and the firming action of said rollers being substantially confined to another but adjoining zone of said rollers, and means so confining them including said means for exerting an axial force, said last means operating upon the hay roll in the feeding and forming zone to move it as it is completed into the adjoining firming zone, said means for sub-dividing the hay roll being operative to cut into sub-divided cylindrical unit lengths those portions of the hay roll in which the said firming has been completed.

References Cited by the Examiner
UNITED STATES PATENTS

| | | | |
|---|---|---|---|
| 799,175 | 9/05 | Luebben | 100—79 X |
| 862,105 | 7/07 | Reagan | 100—40 |
| 963,775 | 7/10 | Killman | 100—43 |
| 983,086 | 1/11 | Reagan | 100—86 X |
| 1,062,066 | 5/13 | Wheeler | 100—79 |
| 1,213,284 | 1/17 | Slathar | 100—40 |
| 2,416,123 | 2/47 | Sieman | 130—5 |
| 2,612,852 | 10/52 | Morrison | 146—87 X |
| 2,716,317 | 8/55 | McClellan | 56—1 |
| 2,716,318 | 8/55 | Skromme | 56—1 |
| 2,833,206 | 5/58 | Callum et al. | 100—79 |

ABRAHAM G. STONE, *Primary Examiner.*

CARL W. ROBINSON, T. GRAHAM CRAVER, ANTONIO F. GUIDA, *Examiners.*